United States Patent
Smith

(10) Patent No.: US 9,003,592 B2
(45) Date of Patent: Apr. 14, 2015

(54) CLEANING POLE SLEEVE

(71) Applicant: Kaj Zingo Smith, Fort Lauderdale, FL (US)

(72) Inventor: Kaj Zingo Smith, Fort Lauderdale, FL (US)

( * ) Notice: Subject to any disclaimer, the term of this patent is extended or adjusted under 35 U.S.C. 154(b) by 26 days.

(21) Appl. No.: 13/901,783

(22) Filed: May 24, 2013

(65) Prior Publication Data

US 2013/0312650 A1 Nov. 28, 2013

Related U.S. Application Data

(60) Provisional application No. 61/651,320, filed on May 24, 2012.

(51) Int. Cl.
| | |
|---|---|
| *B25G 1/00* | (2006.01) |
| *A46B 5/00* | (2006.01) |
| *A46B 17/00* | (2006.01) |
| *B63B 59/08* | (2006.01) |
| *F16F 7/12* | (2006.01) |
| *B63B 9/00* | (2006.01) |
| *B25G 1/01* | (2006.01) |
| *B25G 1/04* | (2006.01) |
| *B25G 1/10* | (2006.01) |
| *B63B 59/06* | (2006.01) |

(52) U.S. Cl.
CPC . *B63B 59/08* (2013.01); *F16F 7/12* (2013.01); *F16F 7/124* (2013.01); *B63B 9/00* (2013.01); *B25G 1/01* (2013.01); *B25G 1/04* (2013.01); *B25G 1/10* (2013.01); *B63B 2059/082* (2013.01); *B63B 59/06* (2013.01)

(58) Field of Classification Search
USPC ............ 15/143.1, 246, 144.4; 16/110.1, 421, 16/422, 430, 431, 435, DIG. 12, DIG. 18
See application file for complete search history.

(56) References Cited

U.S. PATENT DOCUMENTS

| | | | | |
|---|---|---|---|---|
| 184,918 | A | * | 11/1876 | Siddall .......................... 15/143.1 |
| 1,445,968 | A | * | 2/1923 | Levenson ..................... 15/143.1 |
| 1,684,604 | A | * | 9/1928 | Stoessel .......................... 15/246 |
| 1,980,655 | A | | 11/1934 | Balistreri |
| 2,237,969 | A | | 4/1938 | Olsen |
| 2,701,379 | A | | 2/1955 | Balistreri |
| 3,981,043 | A | | 9/1976 | Curry |
| 4,185,375 | A | | 1/1980 | Brown |
| 4,416,166 | A | | 11/1983 | Jannard et al. |

(Continued)

FOREIGN PATENT DOCUMENTS

GB 2466129 * 6/2010

*Primary Examiner* — Mark Spisich
(74) *Attorney, Agent, or Firm* — The Concept Law Group, P.A.; Mark C. Johnson; Scott D. Smiley

(57) ABSTRACT

A pole-cleaning device sleeve having a pole-like member with a proximal end, a distal end, opposite to the proximal end, and a length separating the distal and proximal ends, the pole-like member having a head portion defining a working surface and being coupled to the distal end of the pole-like member, the pole-cleaning device also having a removably couplable sleeve with a distal end substantially adjacent to the head portion, a proximal end terminating at a location along the pole-like member length, and a sleeve length separating the distal and proximal ends, an outer layer being of a substantially deformably-resilient and polymer-based material, an inner layer coupled to the outer layer and contacting an outer surface of the pole-like member, and the outer and inner layers encapsulating at least a portion of the pole-like member.

17 Claims, 6 Drawing Sheets

(56) References Cited

U.S. PATENT DOCUMENTS

| | | |
|---|---|---|
| 4,466,166 A | 8/1984 | Hogarth |
| 4,653,170 A | 3/1987 | Kelson |
| 4,912,836 A | 4/1990 | Avetoom |
| 5,074,023 A | 12/1991 | Decker et al. |
| 5,335,919 A | 8/1994 | Soong |
| 5,348,360 A | 9/1994 | Mencarelli et al. |
| 5,373,616 A | 12/1994 | Biersdorf et al. |
| D367,178 S | 2/1996 | Lydick |
| 5,511,445 A | 4/1996 | Hildebrandt |
| 5,524,885 A | 6/1996 | Heo |
| 6,406,388 B1 | 6/2002 | Davis et al. |
| 6,511,732 B1 | 1/2003 | Chao |
| 6,827,045 B1 | 12/2004 | Willner et al. |
| 7,008,582 B2 | 3/2006 | Chen |
| 7,334,298 B2 * | 2/2008 | Willat et al. .................... 16/435 |
| 8,006,352 B2 | 8/2011 | Roiser |
| 8,007,625 B2 | 8/2011 | Wang |
| 2003/0024543 A1 * | 2/2003 | Wolf .............................. 132/212 |
| 2003/0213115 A1 | 11/2003 | Knapton |
| 2005/0177981 A1 * | 8/2005 | Wang ............................. 16/421 |
| 2007/0072696 A1 | 3/2007 | Chen |

* cited by examiner

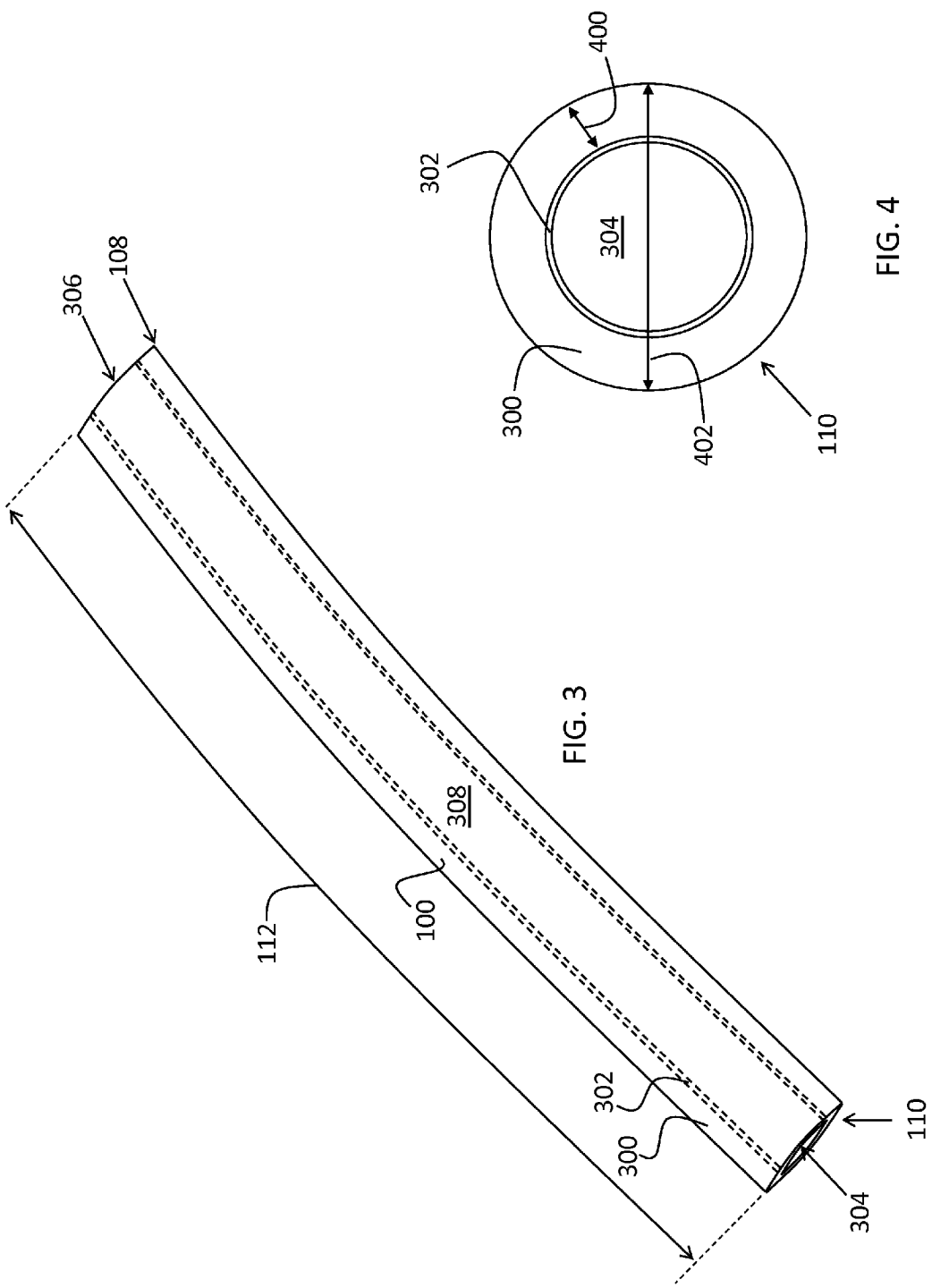

CLEANING POLE SLEEVE

CROSS-REFERENCE TO RELATED APPLICATION

This application claims priority to U.S. Provisional Patent Application No. 61/651,320 filed May 24, 2012, the entirety of which is incorporated by reference.

FIELD OF THE INVENTION

The present invention relates generally to protective covers for cleaning apparatuses, and more particularly relates to protective covers for cleaning brushes having a pole-like member.

BACKGROUND OF THE INVENTION

It is well known that with the purchase of any transportation vehicle comes the added expense to the owner or operator of maintaining that vehicle. This principle is noticeably applicable with respect to marine vessels. Maintenance includes cleaning, resurfacing, or conditioning the outside exterior of the marine vessel generally with a cleaning device having an elongated pole that includes an end opposite to a handle portion of the pole that does the cleaning. Although cleaning devices are primarily used in connection with maintenance of marine vessels and other vehicles, other known devices employ the same structural features used to maintain the exterior/interior of the marine vessel, e.g., paint brushes.

Cleaning and maintaining the exterior surface of the marine vessel, specifically washing or painting, is problematic for many users because of the size or cumbersome shape of most marine vessels. It is estimated that a dirty hull of a marine vessel can increase fuels costs up to about 30%. As such, the user is required to reach or extend the pole over larger surfaces to effectuate proper cleaning or maintenance of the marine vessel. In many instances, the use of the cleaning device results in damage to the boat because the user is often unbalanced or unstable. As the cost to repair most damage to a marine vessel is actually more than the cleaning or maintenance itself, preventing any damage to the marine vessel is very important for users. Also problematic for many users is when the cleaning device becomes dislodged from the user and falls into a body of water, causing the cleaning device to sink to the bottom thereof. As many marine vessels are docked in large bodies of water, retrieving the cleaning device becomes difficult if not impossible. As most of these cleaning devices are also costly to purchase, preserving the life of the cleaning device is also desired.

Most known cleaning devices consist of a metallic or rigid pole with a head located at the distal end of the pole. The head typically has a brush, bristles, or other protuberances coupled thereto. Some known cleaning devices place a raised surface, made typically of rubber, around the perimeter of the head to prevent damage, should the head contact the cleaning or contact surface of the vessel. These "cushioned" heads, however, do not prevent damage on the marine vessel from the pole of the cleaning device. As there are many portions on a marine vessel that require a user to navigate the pole around or across in order to reach a desired cleaning location, the pole tends to contact the surfaces or objects of the vessel. The consequences of this contact are dents, scratches, and other deformations or visual indications of a hard surface contacting a wood, fiberglass, or composite structure. These cushioned heads also do not inhibit the cleaning device from sinking in a usually less dense body of water.

Some other known cleaning devices include rubber grips located at the handle portion of the cleaning device. These devices, however, suffer from many of the above-described deficiencies. Chiefly, they do not provide protection at the head or distal end of the pole, where typically most of the contact occurs. Also, most, if not all, of these devices do not permit the rubber portion from being easily removed from the pole. As such, the user is limited to purchasing an entirely new cleaning device should the rubber portion become damaged. A user is also unable to retrofit pre-existing cleaning devices with protection. Furthermore, because many of these cleaning devices often require the head portion to be extended through use of the pole, most if not all known cleaning devices do not have the ability to protect the marine vessel from contact with the pole when the pole is extended. These cleaning devices also do not prevent a cleaning device from sinking in a body of water.

Therefore, a need exists to overcome the problems with the prior art as discussed above.

SUMMARY OF THE INVENTION

The invention provides a pole-cleaning device sleeve and method of use that overcomes the hereinafore-mentioned disadvantages of the heretofore-known devices and methods of this general type and that facilitates a user in preventing damage to a vehicle when operating the cleaning device incorporating the inventive sleeve. Although the sleeve is incorporated on a cleaning device, its use shall not be so limited, as it may be used in connection with paint brushes, pressure washers, scrapers, among other devices utilizing a pole-like member.

With the foregoing and other objects in view, there is provided, in accordance with the invention, a pole-cleaning device sleeve that includes a pole-like member with a proximal end, a distal end, opposite to the proximal end, and a length separating the distal and proximal ends. The pole-like member also includes a head portion defining a working surface and is coupled to the distal end of the pole-like member. The removably couplable sleeve includes a distal end substantially adjacent to the head portion, a proximal end terminating at a location along the pole-like member length, and a sleeve length separating the distal and proximal ends. The sleeve has an outer layer being of a substantially deformably-resilient and polymer-based material, an inner layer coupled to the outer layer and contacting an outer surface of the pole-like member, and the outer and inner layers encapsulating at least a portion of the pole-like member.

In accordance with a further feature of the present invention, the sleeve is operable to be freely removable from at least one of the distal and proximal ends of the pole-like member.

In accordance with an additional feature of the present invention, the outer layer is of a polymer-based rubber material.

In accordance with yet another feature of the present invention, the outer layer is of a polymer-based, closed-cell, rubber material.

In accordance with a further feature of the present invention, the inner layer is of a fabric material.

In accordance with a further feature of the present invention, the sleeve length is approximately at least one-fourth the pole-like member length.

In accordance with another feature, an embodiment of the present invention includes the sleeve with abutting edges defining a seam spanning the sleeve length, the sleeve further having a couple fastening each of the abutting edges at the distal and proximal ends of the sleeve.

In accordance with a further feature of the present invention, the couple is substantially inelastic.

In accordance with another feature, an embodiment of the present invention includes a sleeve surface of a friction-increasing material that is adjacent to the outer surface of the pole-like member and located at at least one of the distal end and the proximal end of the sleeve.

In accordance with a further feature of the present invention, the inner layer is of a material different than a material of the outer layer.

In accordance with an additional exemplary feature of the present invention, the pole-like member is operable to extend and contract.

In accordance with the present invention, a scrub brush for marine applications is also disclosed with the brush having a tubular body with a proximal end and a distal end opposite the proximal end, a brush head at the distal end of the tubular body, the brush head being of a material and dimension suited for regular scrubbing contact with a hull of a marine vessel and forming a T-shape with the distal end of the tubular body, and a collision damping material on an exterior surface of the tubular body at its distal end proximate the brush head and not extending to the proximal end of the tubular body.

In accordance with an additional feature of the present invention, the collision damping material includes a removable sleeve having an inner layer of fabric material.

In accordance with another feature, an embodiment of the present invention includes the collision damping material having a removable sleeve having an outer layer of synthetic rubber.

In accordance with an additional feature, an embodiment of the present invention includes the collision damping material having a removable sleeve having an outer layer of neoprene.

In accordance with yet another feature of the present invention, the collision damping material is a sleeve with a length of less than half a length of the tubular body.

In accordance with the present invention, a method for assembling an impact resistant pole-like cleaning device, the method including the steps of (1) producing a pole-like member with a proximal end, a distal end, opposite to the proximal end, and a length separating the distal and proximal ends, the pole-like member including a head portion defining a working surface, (2) producing a sleeve with a distal end defining a distal opening, a proximal end defining a proximal opening, and a length separating the distal and proximal ends, and an outer layer being of a substantially deformably-resilient and polymer-based material and coupled to an inner layer, (3) removing the head portion from the distal end of the pole-like member, (4) slidably inserting the distal end of the pole-like member through the proximal and distal openings of the sleeve to encapsulate at least a portion of the pole-like member with the inner and outer layers of the sleeve, and (5) coupling the head portion to the distal end of the pole-like member to place the distal end of the sleeve substantially adjacent to the head portion.

In accordance with another feature of the present invention, the method also includes slidably inserting the distal end of the pole-like member through the proximal and distal openings of the sleeve to place the proximal end of the sleeve at a terminal location along the pole-like member length, the sleeve length being at least one-fourth of the pole-like member length.

Although the invention is illustrated and described herein as embodied in a cleaning pole sleeve and method of use, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the cleaning device.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIG. 3 is a perspective cross-sectional view of the sleeve of FIG. 1 having a proximal end defining a proximal opening, a distal end defining a distal opening, and a channel spanning from the proximal and distal openings in accordance with the present invention;

FIG. 4 is a view of the proximal end of the sleeve of FIG. 1 depicting the inner and outer layers of the sleeve and the channel in accordance with the present invention;

DETAILED DESCRIPTION

Figure 1:
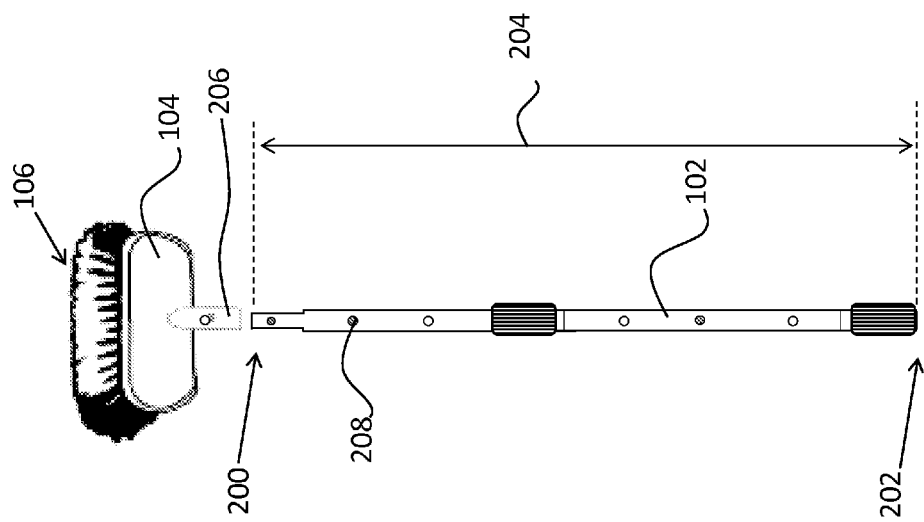
FIG. 1 is a top view of a cleaning apparatus having a pole-like member and a head portion with a sleeve coupled to the pole-like member in accordance with the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient pole-cleaning device sleeve employed to prevent damages to a user's vehicle, specifically a marine vessel, during use of a pole-cleaning device, e.g., a pole brush. Embodiments of the invention provide a sleeve that is easily removable and coupled to those known pole-cleaning devices, thereby making it capable of retrofitting with most known pole apparatuses.

Referring now to FIG. 1, one embodiment of the present invention is shown in a perspective front view with the inventive sleeve 100 coupled to a pole-like member 102. FIG. 1 shows several advantageous features of the present invention, but, as will be described below, the invention can be provided in several shapes, sizes, combinations of features and components, and varying numbers and functions of the components. The first example of a cleaning pole brush sleeve 100, as shown in FIG. 1, includes the attachment of the sleeve 100 to the pole-like member 102. In one embodiment, the pole-like member 102 is a slender, i.e., width is less than its length, metallic pole that is tubular in shape. In other embodiments, the pole-like member 102 may have another oblong-shaped characteristic or shape without deviating from the term "pole-like." The pole-like member 102 may also be made of other materials such as rigid polymers or composites.

Figure 2:
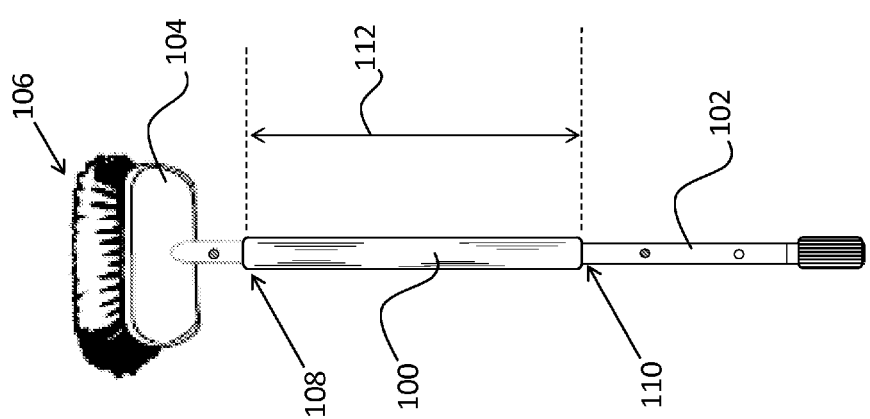
FIG. 2 is a fragmentary exploded top view of the cleaning apparatus of FIG. 1 in accordance with an embodiment of the present invention.

With reference to both FIGS. 1 and 2, FIG. 2 illustrates the pole-like member 102 with the sleeve 100 uncoupled therefrom. The pole-like member 102 includes a head 104 having a working surface 106. The working surface 106 is defined as the operating or acting surface of the head 104 designed for contacting a target object or surface. The head 104 may include the working surface 106, the attachment portion 206 of the head 104, or any other portion. In one embodiment, the working surface 106 is defined by bristles or other filaments composing a brush, as shown in FIG. 2. In other embodiments, the working surface 106 may include fibers that define a surface employed for painting, resurfacing, or other applications used with known pole-like cleaning devices. As such, the term "cleaning" may also incorporate those devices used for maintenance, repairing, and the like.

The pole-like member 102 can be seen having a distal end 200 and a proximal end 202, opposite to the distal end 200. The distal and proximal ends 200, 202 of the pole-like member 102 are separated by a pole-like member length (represented with the arrow 204). In further embodiments, the pole-like member 102 may be operable to extend or contract its length 204 by employing the use of spring-loaded buttons, such as 208. In other embodiments, the pole-like member 102 may employ other means used to extend or contract its length 204, such as adjustable tension grips. The pole-like member 102 may also include handles and other known features typically utilized by these devices. The head 104 may have a first position (shown in FIG. 2) being unattached to the distal end 200 of the pole-like member 102 and a second position (shown in FIG. 1) wherein the head is coupled to the distal end 200. In one embodiment, when the head 104 is coupled to the pole-like member 102 in the second position, the pole-like cleaning device produces a T-shape. This T-shape may include any orientation where the head 104 passes by or traverses the distal end 200 of the pole-like member 102 substantially perpendicular to a point at the distal end 200. In other embodiments, the head 104 may not have a T-shape with respect to the distal end 200 of the pole-like member 102.

The sleeve 100 can be seen having a distal end 108 substantially adjacent to the head portion 104, a proximal end 110 terminating at a location along the pole-like member length 204, and a sleeve length (represented with the arrow 112) separating the distal and proximal ends 108, 110. The term "substantially adjacent" is defined as being side-by-side a referencing object or within approximately 2-3 inches from said referencing object. In accordance with the present invention, the referencing object is the head portion 104 of the pole-like member 102.

The placement of the sleeve 100, in combination with its deformably-resilient properties, advantageously provides protection to the target of working surface 106, i.e., a marine hull or deck. Additionally, the sleeve 100 allows the cleaning device to be utilized as intended without inhibiting its performance or use. Again, this is particularly beneficial to surfaces such as marine vessels which are made from material easily prone to exhibiting dents, scratches, and other incidences of contact with poles of those known cleaning devices. As the structural integrity of the hull and the removal of dirt and other debris are axiomatic to a marine vessel's performance, effectuating a extensive cleaning without damaging the marine vessel is beneficial to many owners and users.

With reference to FIGS. 3 and 4, the sleeve 100 is illustrated in a cross-sectional view and a close-up front view (from the perspective of the proximal end 110) of the sleeve 100, respectively. In one embodiment, the sleeve 100 has a cylindrical-like shape made up of an outer layer 300 and an inner layer 302. To permit the sleeve to slidably couple and be removed from the pole-like member 102, the proximal end 110 defines a proximal opening 304 and the distal end 108 defines a distal opening 306. Each opening 304, 306 is separated by a channel 308 sized to permit the pole-like member 102 to enter and regress from the channel 308. Said another way, when a pole-like member 102 is placed within the channel 308, the outer and inner layers 300, 302 are said to encapsulate the pole-like member 102. In other embodiments, the shape of the sleeve 100 may be rectangular or may have another shape that may or may not conform to the shape of the pole-like member 102.

To effectively prevent damage to a target of the working surface 106, the outer layer 300 is made of a substantially deformably-resilient (or collision damping—deforming to a compressive force) and polymer-based material. The term "deformably-resilient" is defined as having a surface or material with the ability to at least change in shape when disposed to forces of a user, e.g., 0.5-2 lbf, while then returning to its original shape. The material is said to be "substantially" deformably-resilient as there may be portions of the material, albeit potentially on the molecular level, that experience some form of permanent deformation or resist the change in shape when exposed to said forces. As the In one embodiment, the outer layer 300 is a viscoelastic material which has both elastic and viscous properties. Said another way, the outer layer 300 has properties that immediately returns to its original state, while having other properties that respond to strain dependent on the time it is exposed to (or removed from) forces/stresses. In other embodiments, the outer layer 300 has purely elastic properties.

In the preferred embodiment, the outer layer 300 is a made of a polymer-based rubber material such as neoprene. In other embodiments, the outer layer 300 may be made with other synthetic rubber, natural rubber, or other deformably-resilient, polymer-based, materials. This beneficially facilitates the sleeve 100 being produced with relatively inexpensive manufacturing costs compared to other covers that require composites or thermoset materials. To facilitate the sleeve 100 in being able to keep itself and the pole-like member 102 afloat a body of water, the outer layer 300 may also be made of a closed-cell polymer-based material, such as foamed neoprene. In further embodiments, the material is foamed with a gas, such as nitrogen. As such, the sleeve 100 is relatively un-porous and resistant to the entry of fluid, thereby preventing saturation and consequently a greater density/weight. This advantageously makes the sleeve 100 and pole-like member 102 more buoyant than any known pole sleeves. As such, a cleaning device that is dropped into a body of water, which ordinarily sinks, now stays afloat thereby saving a user both the time and cost of purchasing a new cleaning device.

In one embodiment, the inner layer 302 of the sleeve 100 is made of a material that is of a fabric material. This advantageously allows the sleeve 100 to easily slide along or be adjusted along the pole-like member length 204 (shown in FIG. 2). As polymer-based rubber materials, such as those used for the outer layer 300, generally produce a higher coefficient of friction with the pole-like member 102, the fabric facilitates the sleeve 100 in being removed and placed on the pole-like member 102 quickly and easily. The fabric material may consist of material made up of natural or synthetic fibers that include nylon, cotton, acrylic, and lycra, among others. As such, the inner layer 302 is said to be made of a material different than the material of the outer layer 300. In other embodiments, the inner layer 302 may be made of a non-fabric material such as polymer sheets, composites, and other materials that generally produce a lower coefficient of friction with the pole-like member 102 than the outer layer 300. The inner layer 302 may also consist of a coating that is affixed onto the outer layer 300. In other embodiments, the sleeve 100 is composed of only the outer layer 300 with an inner surface that is operable to be placed in contact with the pole-like member 102.

As such, the sleeve 100 is operable to be freely removable from either the distal and proximal ends 200, 202 of the pole-like member 102 (shown in FIG. 2). The term "freely removable" is defined as having the ability to detach or uncouple from a referencing object or surface with a parallel force (relative to the longitudinal direction of a referencing object or surface) typically generated by a user, e.g., 30-40 lbf, and without any external devices or forces, relative to the user. This permits the sleeve 100 to be removed in a one-pulling motion by the user. Said another way, the user is able to slide the sleeve 100 onto the pole-like member 102 in one continuous motion. In other embodiments, the user may require more than one continuous motion or may require the user to perform multiple steps to remove or attached the sleeve 100.

The outer layer 300 may be coupled to the inner layer 302 using adhesives or other bonding techniques. As seen in FIG. 3 the outer and inner layers 300, 302 can be seen substantially spanning the sleeve length 112. Said another way the outer and inner layers 300, 302 may extend the entire length of the sleeve 100, may have portions that do not completely extend to either the distal or proximal ends 108, 110 of the sleeve 100, or may have portions that define discontinuous gaps along the sleeve length 112 without deviating from the term substantially spanning. In one embodiment, the outer layer 300 is approximately 0.10-0.30" in width 400 and the inner layer 302 is approximately 4-10 mils (one thousandth of an inch). In other embodiments, the widths of either the outer or inner layers 300, 302 are greater or less than said dimensions. As such, the diameter 402 of the sleeve 100 may be approximately 1-1.5" in width. In other embodiments, the diameter 402 of sleeve 100 may be greater or less than approximately 1-1.5" in width, depending on width of the pole-like member 102.

With reference briefly back to FIGS. 1 and 2, the sleeve length 112 can be seen being approximately at least one-fourth the pole-like member length 204. The length 112 of the sleeve 100 prevents the pole-like member 102 from directly contacting with a target surface to which it is directed. As a majority of contact with the pole-like member 102 and a target surface occurs in the upper portion of the pole-like member 102 (i.e., below the head portion 104), the sleeve 100 effectuates the use of the cleaning apparatus while simultaneously reducing the probability of damage to the target surface. This is extremely beneficially for those cleaning apparatuses used with boats/marine vessels having outer surfaces that are prone to exhibiting signs of damage upon minimal exposure to external forces. In one embodiment, the length 112 of the sleeve 100 may span 1-2' in length, but may also be less or greater than 1-2'. The sleeve 100 may also have attachments or coupling contacts on it to facilitate the attachment of the sleeve 100 to the pole-like member 102.

Figure 5:
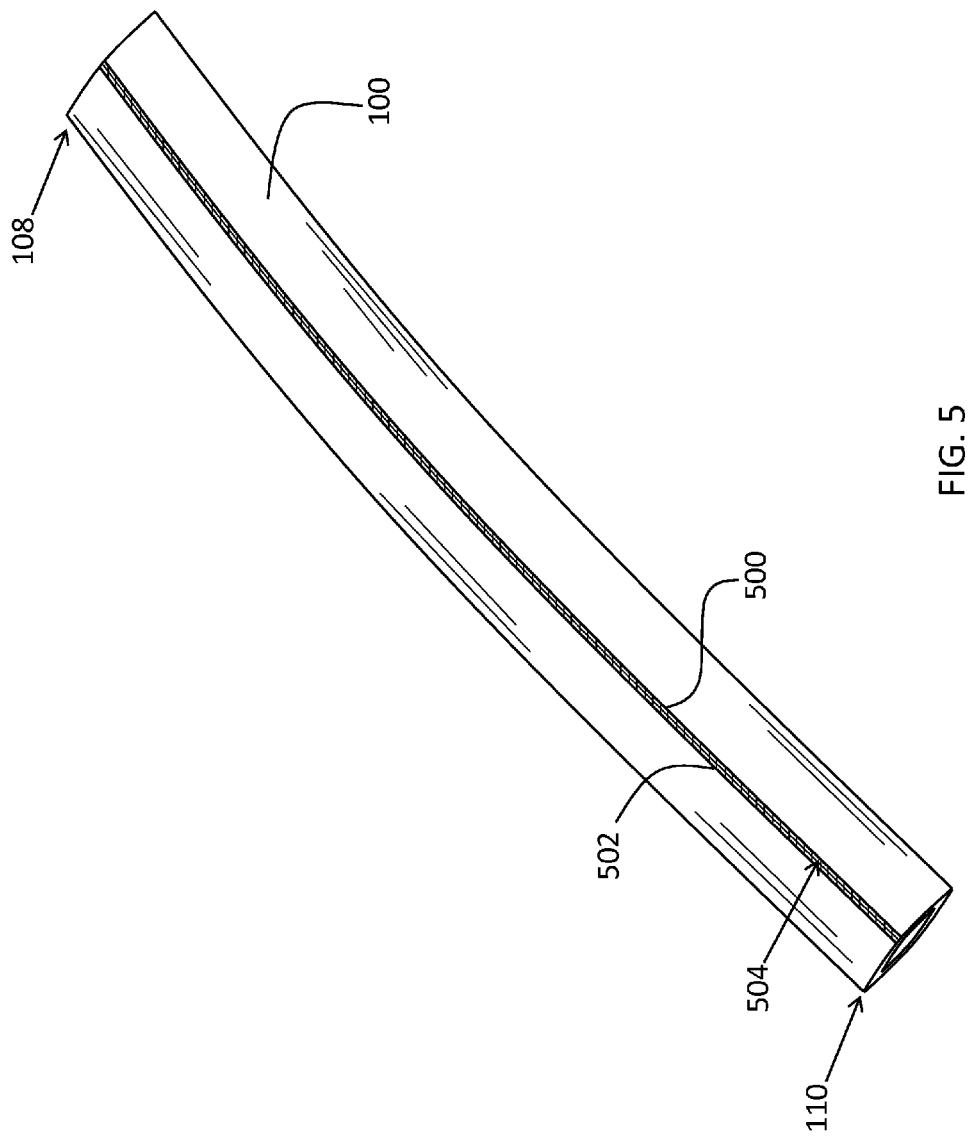
FIG. 5 is a perspective downward-looking view of a sleeve having a two abutting edges that define a seam in accordance with an embodiment of the present invention.

FIG. 5 illustrates a downward-looking perspective view of the sleeve 100. In one embodiment, the sleeve 100 is formed by joining two opposing edges of an oblong sheet of material making up the outer and inner layers 300, 302. The combination of the opposing edges forms the tubular-shaped sleeve 100 shown in FIG. 5. The coupling of the two opposing edges 500, 502 can be seen to form a seam (or a line 504 defined by two abutting edges) in FIG. 5 extending longitudinally along the sleeve length 112 (shown in FIG. 3). The two abutting edges 500, 502 may be coupled using adhesives, thermal bonding, or other known manufacturing techniques. In other embodiments, the sleeve 100 may be formed through extrusion, molding, or other fabrication methods. The sleeve 100 may utilize woven fabric to facilitate the coupling of the two abutting edges 500, 502. This may occur using blind stitching, or stitching that does not completely pierce the outer layer 300 (shown in FIG. 3) of the sleeve 100. Besides providing a more aesthetically pleasing appearance, the seam 504 also provides a user with a visual guideline to match with any buttons 208 utilized by the pole-like member 102 (shown in FIG. 2).

Figure 6:
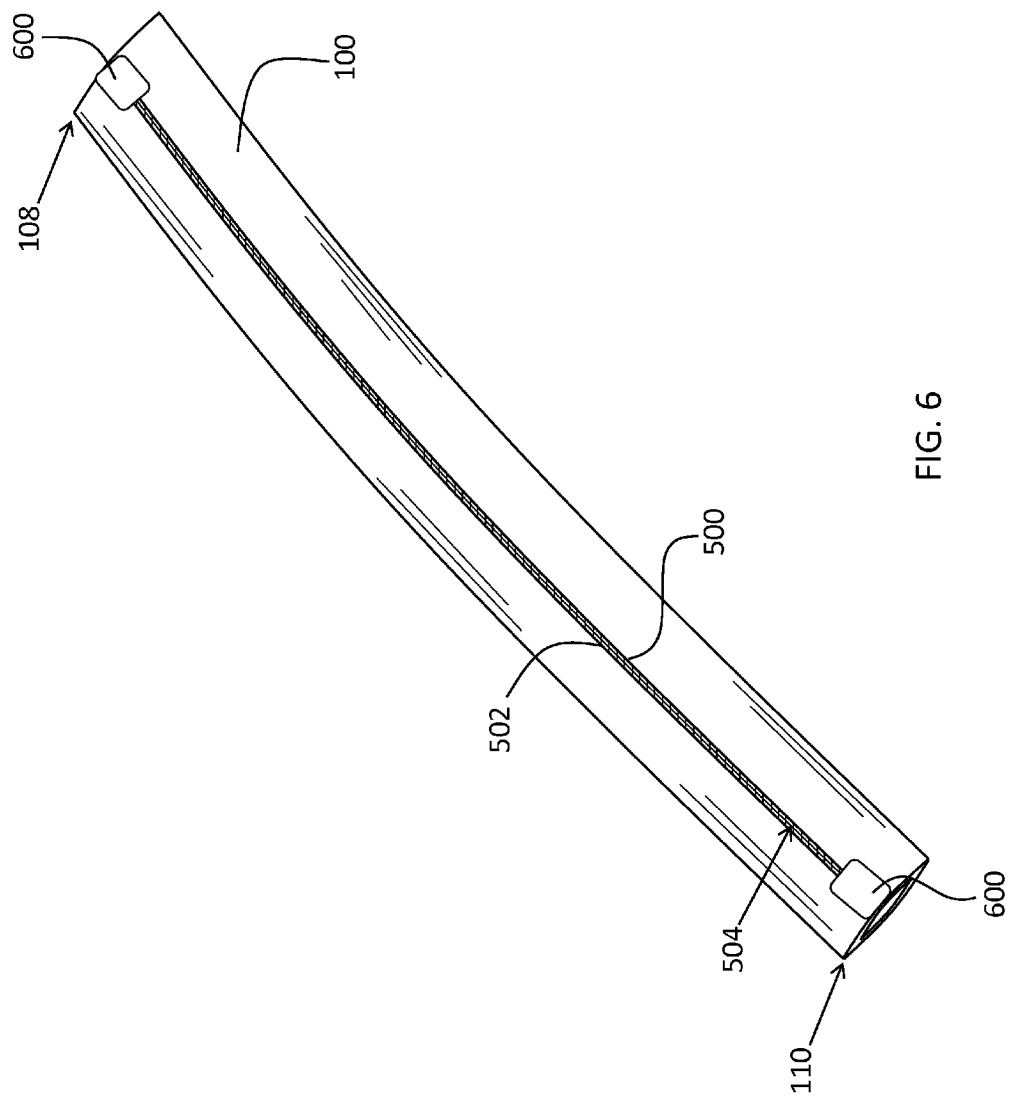
FIG. 6 is a perspective downward-looking view of the sleeve of FIG. 5 having a couple located at the distal and proximal ends of the sleeve that joins the two abutting edges in accordance with an embodiment of the present invention.

With reference to FIG. 6, in one embodiment the sleeve 100 can be seen having a couple 600 fastening each of the abutting edges 500, 502. More specifically, the couple 600 is located at the distal and proximal ends 108, 110 of the sleeve 100. As the terminal ends of the seam 504 are the most prone to failure, the couple 600 further facilitates a secure coupling of the abutting edges 500, 502. The couple 600, like the outer and inner layers 300, 302, may be made of a water-proof material. The couple 600 may be made of nylon, lycra, polyester, or other fabric, composite, or polymer-based material and may be fastened to each of the abutting edges 500, 502 using adhesives, thread, or other coupling mechanism. In other embodiments, the couple 600 may be substantially inelastic or substantially resistant to elastic deformation. Said another way, the couple 600 will be less elastic than both the outer and inner layers 300, 302. As such, the seam 504 will maintain its integrity at the distal and proximal ends 108, 110 when being exposed to tensile forces perpendicular to the outer surface of the sleeve 100 generally required to remove or attach the sleeve 100 to the pole-like member 102. In other embodiments, the couple 600 may be elastic.

In alternative embodiments, the a piece of material, which may include a surface of the outer layer 300, may be folded over one or more of the distal or proximal ends 108, 110 to adequately and sufficiently facilitate in the retention of the abutting edges 500, 502. The piece of material may be made of any material discussed above, but is preferably made of the material consisting of the outermost surface of the outer layer 300. The piece of material may be folded inwardly toward the each of the openings 304, 306, or outwardly toward the outer surface of the outer layer 300. The above-described retention method not only assures sufficient retention, but it also increases the ability of the sleeve 100 to be removed and inserted on the pole-like member 102.

Figure 7:
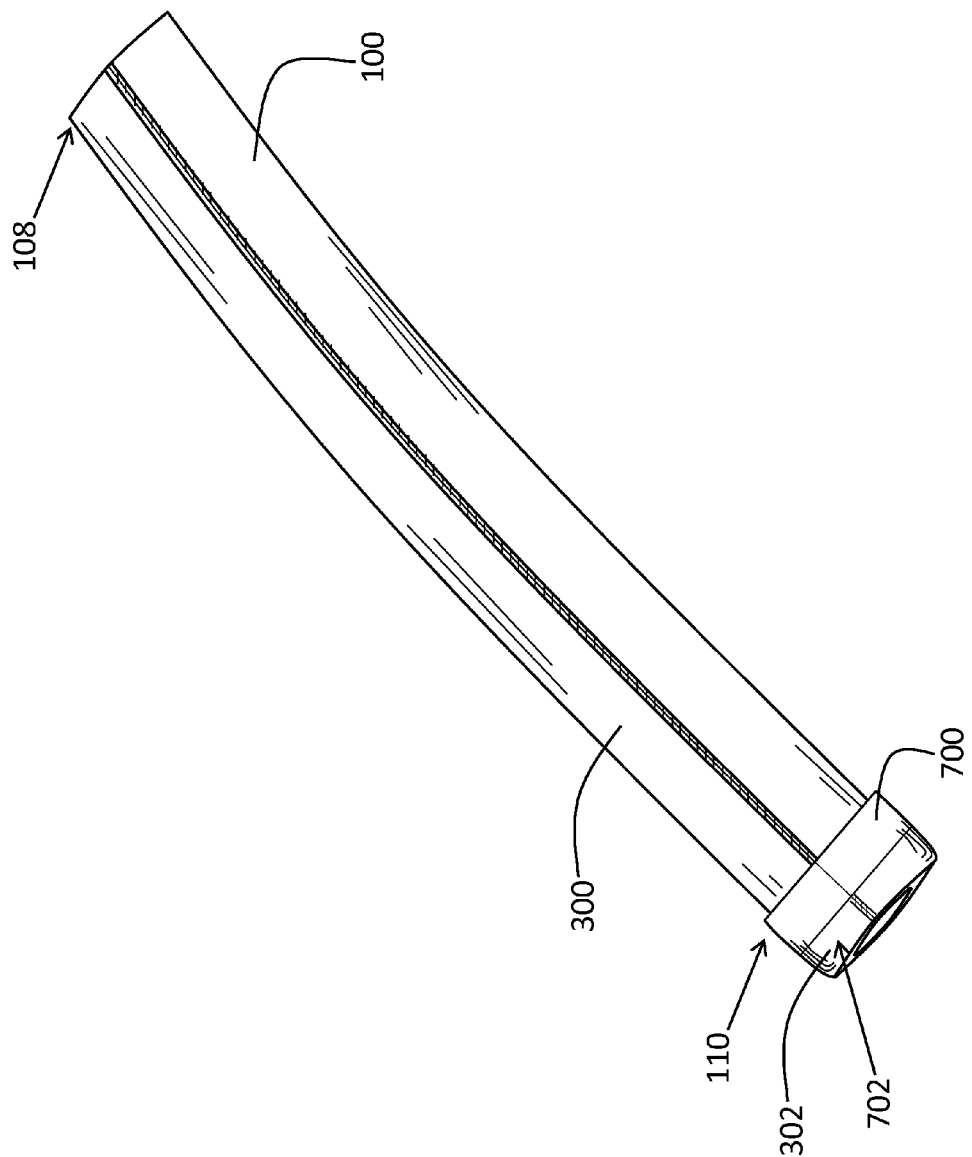
FIG. 7 is a perspective downward-looking view of the sleeve of FIG. 5 with the proximal end of the sleeve turned inside-out on itself and depicting a friction-increasing surface in accordance with an embodiment of the present invention.

FIG. 7 illustrates the sleeve 100 having a sleeve surface 700 of a friction-increasing material located at either, or both, the distal and proximal ends 108, 110 of the sleeve 100. The friction-increasing surface 700 advantageously restrains the sleeve 100 from sliding longitudinally along the length 204 of the pole-like member 102 (shown in FIG. 2) to which it is coupled. Therefore, the user is assured the sleeve 100 will not adjust or shift positions during use of the cleaning apparatus. In the exemplary embodiment shown in FIG. 7, the proximal end 110 of the sleeve 100 is turned inside-out on itself to reveal the inner surface 702 of the sleeve 100, including both the friction-increasing surface 700 and the inner layer 302. The term "friction increasing" is defined relative to the material making up the inner layer 302. For example, should the inner layer 302 be a fabric material, the friction-increasing surface 700 would have a higher coefficient of friction with the contacting surface of the pole-like member 102 than the fabric material. In one embodiment, the friction-increasing surface 700 is made of the same material used to make the outer layer 300. As such, the inner layer 302 would span to a terminal location before the edge of the proximal end 110, thereby providing a friction-increasing surface 700 for contacting the pole-like member 102. Furthermore, during use of the sleeve 100, the friction-increasing surface 700 is placed in a location adjacent to the head portion 104 of the cleaning apparatus and has its contact surface adjacent to the outer surface of the pole-like member 102.

Figure 8:
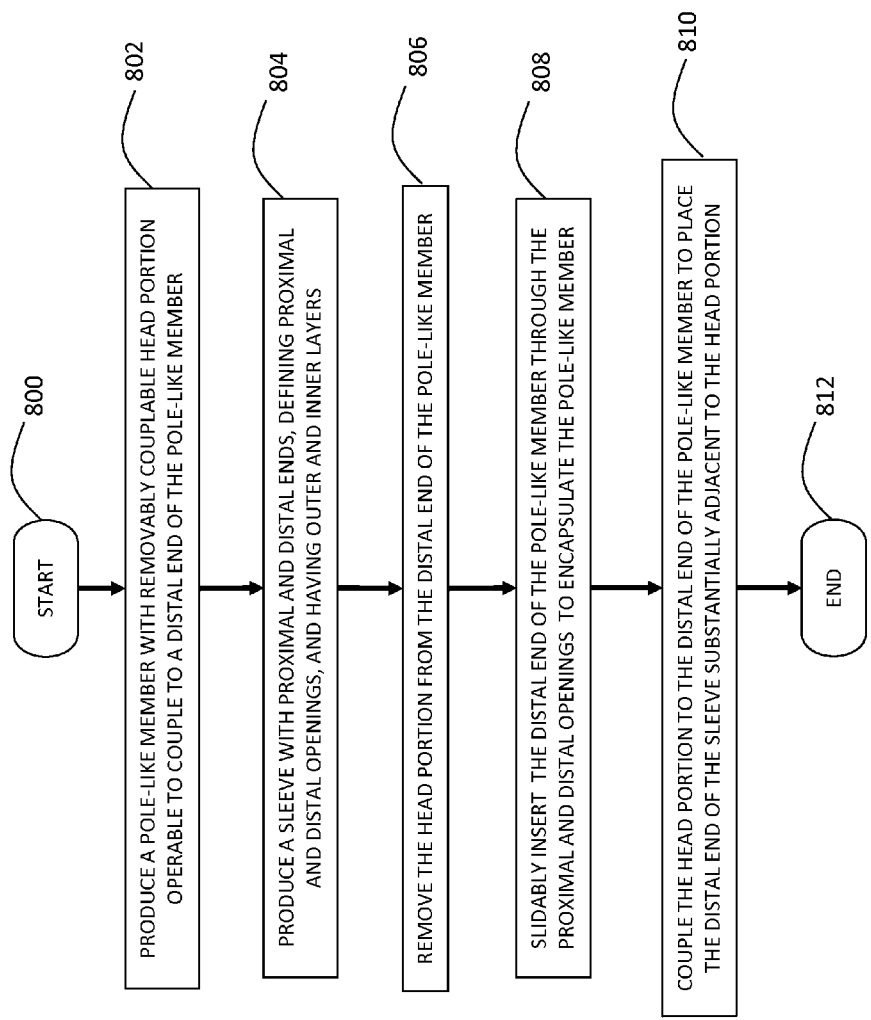
FIG. 8 is a process flow diagram depicting a method of assembling an impact resistant cleaning device in accordance with the present invention.

With reference now to FIG. 8, a process flow diagram is shown depicting the novel method of assembly an impact resistant pole-cleaning device in accordance with the present invention. The method starts at step 800 and immediately proceeds to step 802 of producing a pole-like member with a proximal end, a distal end (opposite to the proximal end), and a pole-like member length separating the distal and proximal ends. As discussed above, the pole-like member includes a removably couplable head portion, i.e., a first and second position (shown in FIGS. 1 and 2), defining a working surface. The process continues to step 804 of producing a sleeve that includes a distal end defining a distal opening, a proximal end defining a proximal opening, and a sleeve length separating the distal and proximal ends. As described above in detail, the sleeve also includes an outer layer being of a substantially deformably-resilient and polymer-based material, which substantially spans the sleeve length, and couples to an inner layer, and coupled to the inner layer.

The process continues to step 806, or removing the head portion from the distal end of the pole-like member. Once the head portion is uncoupled from the distal end of the pole-like member, step 808 includes slidably-inserting the distal end of the pole-like member through the proximal and distal openings of the sleeve to encapsulate the pole-like member with the inner and outer layers of the sleeve. As the material of sleeve may be flexible, the user can apply a tensile force at the distal and proximal ends of the sleeve, perpendicular to the longitudinal direction of sleeve, to facilitate a quick attachment and removal. The inner layer permits the sleeve to slide easily along the pole-like member to a position desirable by the user.

Subsequently, the process continues to the step 810 of coupling the head portion to the distal end of the pole-like member. Consequently, the distal end of the sleeve is substantially adjacent to the head portion. Said another way, the distal end of the sleeve is within approximately 0-3" of the head portion to effectuate an impact resistant pole-cleaning device, such as a cleaning brush.

In further embodiments, the sleeve may be slidably-inserted on the distal end of the pole-like member, through the proximal and distal openings of the sleeve, to place the proximal end of the sleeve at a terminal location along the pole-like member length such that the sleeve length is at least one-fourth of the pole-like member length. The above process terminates in step 812.

A pole-cleaning device sleeve has been disclosed that couples to a pole-like member (e.g., utilized with a typical cleaning apparatus) and inhibits the tough and hard exterior of the pole from causing damage to a target surface upon which the cleaning apparatus is directed. Advantageously, the pole brush sleeve is easily removed and attached to those standard pole-like members used for the cleaning apparatuses, thereby provided a retrofitting solution having broad application. The present invention permits unrestricted use of a cleaning apparatus, while simultaneously resisting the pole from causing damages to the target surface while the cleaning apparatus is in use.

What is claimed is:

1. A sleeved pole-like cleaning device comprising:
a pole-like member with a proximal end, a distal end, opposite to the proximal end, and a length separating the distal and proximal ends, the pole-like member having a head portion defining a working surface and being coupled to the distal end of the pole-like member; and
a removably couplable, substantially cylindrical, sleeve having:
a distal end within approximately 3 inches from the head portion, a proximal end terminating at a location along the pole-like member length, and a sleeve length separating the distal and proximal ends;
a first elastomeric layer being of a substantially deformably-resilient and polymer-based, closed-cell, material providing a degree of positive buoyancy;

a second fabric layer coupled to the first layer and contacting an outer surface of the pole-like member; and the first and second layers encapsulating at least a portion of the pole-like member.

2. The sleeved pole-like cleaning device according to claim 1, wherein:

the sleeve is operable to be freely removable from at least one of the distal and proximal ends of the pole-like member.

3. The sleeved pole-like cleaning device according to claim 1, wherein:

the first layer is of a polymer-based rubber material.

4. The sleeved pole-like cleaning device according to claim 1, wherein:

the sleeve length is approximately at least one-fourth the pole-like member length.

5. The sleeved pole-like cleaning device according to claim 1, wherein the sleeve has abutting edges defining a seam spanning the sleeve length, the sleeve further comprising:

a couple fastening each of the abutting edges at the distal and proximal ends of the sleeve.

6. The sleeved pole-like cleaning device according to claim 5, wherein:

the couple is substantially inelastic.

7. The sleeved pole-like cleaning device according to claim 1, further comprising:

a sleeve surface of a friction-increasing material that is adjacent to the outer surface of the pole-like member and located at at least one of the distal end and the proximal end of the sleeve.

8. The sleeved pole-like cleaning device according to claim 1, wherein:

the second layer is of a material different than a material of the outer layer.

9. The sleeved pole-like cleaning device according to claim 1, wherein:

the pole-like member is operable to extend and contract.

10. A scrub brush for marine applications, the brush comprising:

a tubular body having a proximal end and a distal end opposite the proximal end;

a brush head at the distal end of the tubular body, the brush head being of a material and dimension suited for regular scrubbing contact with a hull of a marine vessel and forming a T-shape with the distal end of the tubular body; and a collision damping material on an exterior surface of the tubular body and disposed at the distal end of the tubular body, within approximately 3 inches from the brush head, and not extending to the proximal end of the tubular body, the collision damping material having:

a first layer of a fabric material; and a second layer of a polymer-based elastomeric closed-cell material providing a degree of positive buoyancy.

11. The scrub brush for marine applications according to claim 10, wherein:

the second layer is of synthetic rubber.

12. The scrub brush for marine applications according to claim 10, wherein:

the second layer is of neoprene.

13. The scrub brush for marine applications according to claim 10, wherein:

the collision damping material is a sleeve having a length of less than half a length of the tubular body.

14. A sleeved pole-like cleaning device comprising:

a pole-like member with a proximal end, a distal end, opposite to the proximal end, and a length separating the distal and proximal ends, the pole-like member having a head portion defining a working surface and being coupled to the distal end of the pole-like member; and a removably couplable sleeve having:

a distal end proximate to the head portion, a proximal end terminating at a location along the pole-like member length, and a sleeve length separating the distal and proximal ends;

a first layer being of a substantially deformably-resilient and polymer-based material;

a second layer coupled to the first layer and contacting an outer surface of the pole-like member;

two opposing side edges spanning the sleeve length and coupled together by a coupling medium to form a seam along the sleeve length;

a couple:

overlaying the first and second layers of the sleeve and the seam; and fastened to each of the two opposing side edges of the sleeve to provide reinforcement against separation of the two opposing side edges; and the first and second layers encapsulating at least a portion of the pole-like member.

15. The sleeved pole-like cleaning device according to claim 14, wherein:

the couple is substantially inelastic.

16. The sleeved pole-like cleaning device according to claim 14, wherein:

the couple is of a material different than the first and second layers of the sleeve.

17. The sleeved pole-like cleaning device according to claim 14, wherein:

the couple spans the entire sleeve length.

\* \* \* \* \*